(12) United States Patent
Romanowski et al.

(10) Patent No.: US 9,230,735 B2
(45) Date of Patent: Jan. 5, 2016

(54) ELECTRICAL COIL FORMING APPARATUS AND METHODS OF ASSEMBLING ELECTRICAL COILS

(71) Applicant: Regal Beloit America, Inc., Beloit, WI (US)

(72) Inventors: Dale Romanowski, Wausau, WI (US); William J. Conway, Wausau, WI (US)

(73) Assignee: Regal Beloit America, Inc., Beloit, WI (US)

(*) Notice: Subject to any disclaimer, the term of this patent is extended or adjusted under 35 U.S.C. 154(b) by 340 days.

(21) Appl. No.: 13/793,323

(22) Filed: Mar. 11, 2013

(65) Prior Publication Data

US 2014/0252906 A1 Sep. 11, 2014

(51) Int. Cl.
*H01F 41/06* (2006.01)
*H02K 15/04* (2006.01)

(52) U.S. Cl.
CPC .......... *H01F 41/0625* (2013.01); *H01F 41/065* (2013.01); *H02K 15/0457* (2013.01)

(58) Field of Classification Search
CPC . H01F 41/04; H01F 41/065; Y10T 29/49009; Y10T 29/49071
USPC ................. 242/432.5, 590, 430, 433; 29/605; 140/71 C, 92.1
See application file for complete search history.

(56) References Cited

U.S. PATENT DOCUMENTS

| | | | |
|---|---|---|---|
| 693,579 A | 2/1902 | Wait | |
| 3,958,611 A | 5/1976 | Lesch et al. | |
| 4,488,685 A * | 12/1984 | Iida | 242/434.5 |
| 4,817,256 A * | 4/1989 | Riti et al. | 29/33 L |
| 4,835,841 A | 6/1989 | Gunnels et al. | |
| 4,928,894 A | 5/1990 | Ohno et al. | |
| 5,375,786 A * | 12/1994 | Ta-Yueh et al. | 242/377 |
| 5,397,070 A | 3/1995 | Yano | |
| 5,538,196 A | 7/1996 | Auchincloss et al. | |
| 5,959,433 A | 9/1999 | Rohde | |
| 6,003,805 A | 12/1999 | Newman | |
| D423,028 S | 4/2000 | Okura et al. | |
| D454,839 S | 3/2002 | Hoglund | |
| D469,500 S | 1/2003 | Hoo | |
| 6,679,449 B2 * | 1/2004 | Sugiuchi | 242/439.1 |
| 6,791,227 B2 | 9/2004 | Yasuhara et al. | |
| 6,806,611 B2 | 10/2004 | Bharaj et al. | |
| D565,508 S | 4/2008 | Ogawa et al. | |
| 7,467,648 B2 * | 12/2008 | Hashimoto et al. | 140/92.1 |
| 7,705,508 B2 | 4/2010 | Dooley et al. | |

(Continued)

*Primary Examiner* — Thanh Lam
(74) *Attorney, Agent, or Firm* — Armstrong Teasdale LLP

(57) ABSTRACT

A coil forming apparatus for forming an electrical coil from an electrical wire. The apparatus includes a frame and a spindle assembly coupled to the frame. The spindle assembly includes: a first arm coupled to the frame, wherein the first arm includes a first moveable bracket and a plurality of first moveable spindles coupled to the first moveable bracket and to the electrical wire in a first position. The spindle assembly further includes a second arm coupled to the frame, wherein the second arm has a second moveable bracket that includes a plurality of second moveable spindles coupled to the second moveable bracket and coupled to the electrical wire in the first position. The coil forming apparatus includes a drive system coupled to the first moveable bracket and the second moveable bracket. The drive system is configured to move the first moveable bracket and the second moveable bracket.

16 Claims, 12 Drawing Sheets

(56) References Cited

U.S. PATENT DOCUMENTS

| | | | |
|---|---|---|---|
| 7,775,474 B2* | 8/2010 | Maruyama | 242/434.9 |
| D640,198 S | 6/2011 | Wu et al. | |
| 8,122,588 B2 | 2/2012 | Awano et al. | |
| 2008/0010812 A1 | 1/2008 | Clark | |
| 2012/0066897 A1 | 3/2012 | Hiramatsu et al. | |
| 2012/0141292 A1 | 6/2012 | Signore et al. | |
| 2013/0248638 A1* | 9/2013 | Luo et al. | 242/470 |
| 2015/0090830 A1* | 4/2015 | Romas et al. | 242/479.2 |

* cited by examiner

ELECTRICAL COIL FORMING APPARATUS AND METHODS OF ASSEMBLING ELECTRICAL COILS

BACKGROUND OF THE INVENTION

The embodiments described herein relate generally to electrical coils, and more particularly, to an electrical coil forming apparatus used in forming electrical coils for electrical machines.

Some electrical machines, such as a motor, typically include a stator having a plurality of electrical coils wound around a stator core. The stator core is generally formed by laminating a plurality of ring plates, and includes an inner circumference having a plurality of slots that extend along an axis of rotation of the electrical machine. In some stator designs, the electrical coils are coated with an electrically insulating enamel, and are wound around the stator core by inserting a portion of each stator coil into, and through, pairs of the slots.

Prior to insertion into the stator slots, the electrical coil is formed by winding a plurality of electrical wires within a winding tool. Some winding tools guide the electrical wires from a spool and around spindles. The spindles segregate the electrical wires into discrete bundles of electrical wires. The tool may continue to wrap the bundle of electrical wires around other circumferentially spaced spindles to form the electrical coil, which has a pair of opposing straight sections and a pair of opposing end turns.

Conventional electrical coils may include four bends within the straight sections and the end turns. This configuration, however, may lead to increased lengths of the straight portions and the end turns which may result in excess material needed for a particular application within the electrical machine. Further, the increased lengths at the end turns may interfere with motor components such as brackets and baffles. Moreover, the excess length and material may increase losses, such as resistive losses and thermal losses, during operation of the electrical coils. Further, during some insertion procedures, conventional coil configurations may increase the labor involved in pushing the electrical coils into the stator slots which may lead to negative ergonomic effects applied to the installer's hands and/or arms. After insertion of conventional electrical coils, the end turns may need to be further pushed and/or bent to make room for insertion of an adjacent electrical coil which may lead to cracking or other damage to the insulating coating and to further stress applied to the installer's hands and/or arms.

BRIEF DESCRIPTION OF THE INVENTION

In one aspect, a coil forming apparatus for forming an electrical coil from an electrical wire is provided. The apparatus includes a frame and a spindle assembly coupled to the frame. The spindle assembly includes a first arm coupled to the frame, wherein the first arm includes a first moveable bracket and a plurality of first moveable spindles coupled to the first moveable bracket and to the electrical wire in a first position. The spindle assembly further includes a second arm coupled to the frame, wherein the second arm has a second moveable bracket that includes a plurality of second moveable spindles coupled to the second moveable bracket and coupled to the electrical wire in the first position. The coil forming apparatus includes a drive system coupled to the first moveable bracket and the second moveable bracket. The drive system is configured to: move the second moveable bracket toward the frame to a second position, wherein the plurality of second moveable spindles of the second arm are configured to form a bend in the electrical wire; and move the first moveable bracket away from the frame to a third position, wherein the plurality of first moveable spindles of the first arm are configured to form another bend in the electrical wire.

In another aspect, an electrical coil for insertion into an electrical machine is provided. The electrical coil includes a first end turn extending in a first plane and includes a first bend; a second end turn extending parallel to the first end turn in the first plane and includes a second bend; a first straight segment coupled to the first end turn and the second end turn and extending in a second plane that is different than the first plane; and a second straight segment coupled to the first end turn and the second end turn and extending in a third plane that is different than the first plane and the second plane.

In a further aspect, a method of manufacturing an electrical coil from an electrical wire is provided. The method includes coupling the electrical wire to a first moveable bracket of a spindle assembly, the first moveable bracket positioned in a first position with respect to a frame of the spindle assembly; coupling the electrical wire to a second moveable bracket of the spindle assembly, the second moveable bracket positioned in the first position with respect to the frame; and moving the second moveable bracket toward the frame to a second position. The method further includes coupling a plurality of second moveable spindles of the second moveable bracket to the electrical wire and forming a first bend in the electrical wire; moving the first moveable bracket away from the frame to a third position; and coupling a plurality of first moveable spindles of the first moveable bracket to the electrical wire and forming another bend in the electrical wire.

DETAILED DESCRIPTION OF THE INVENTION

The embodiments described herein relate to electrical coils and methods of assembling the electrical coils. More particularly, the embodiments relate to a coil forming apparatus that is configured to form electrical coils for electrical machines. It should be understood that the embodiments described herein for electrical coils and electrical machines are not limited to motors, and further understood that the descriptions and figures that utilize an electrical coil, and motor are exemplary only.

Figure 1:
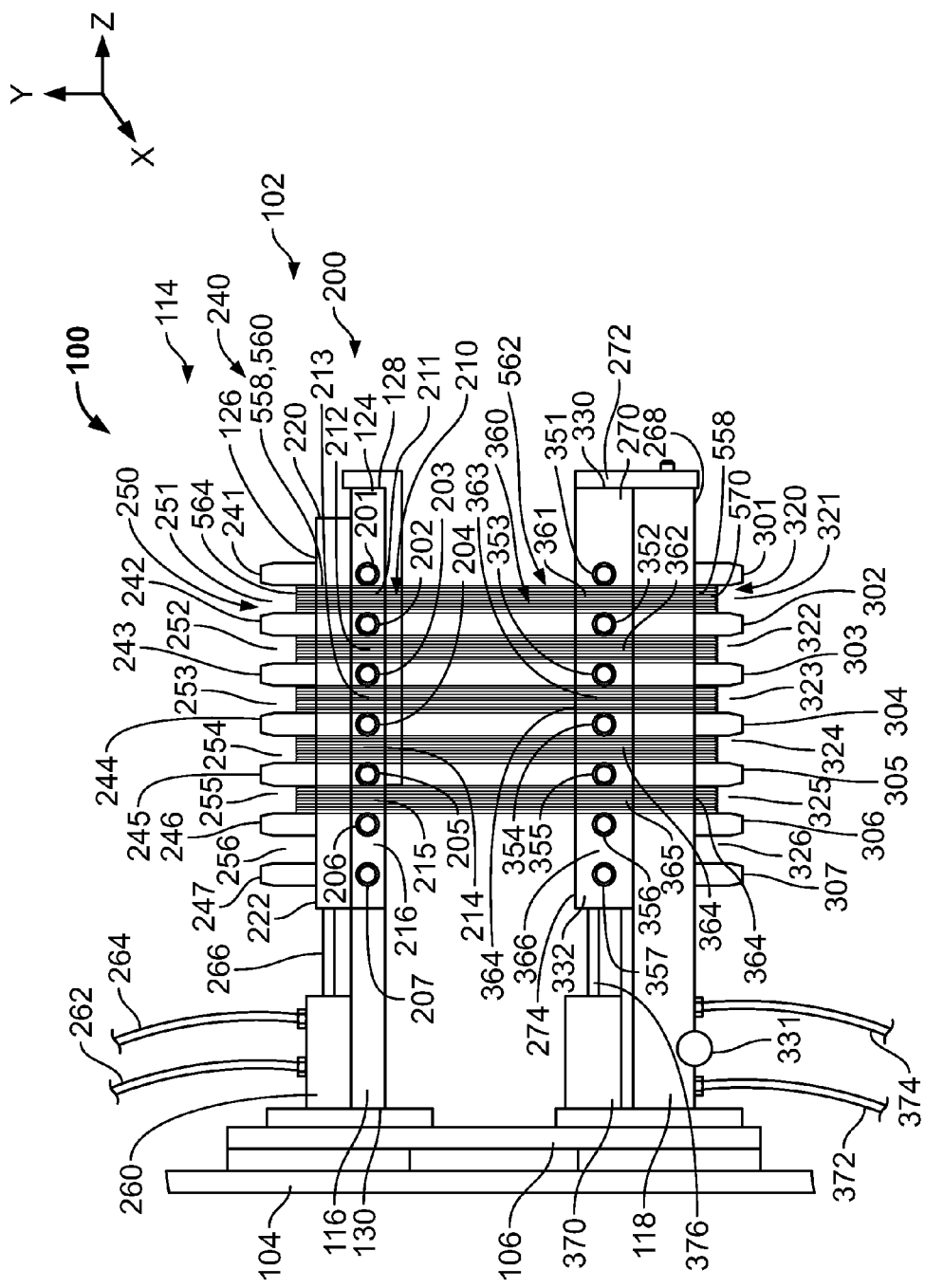
FIG. 1 is a side elevational view of an exemplary coil forming apparatus shown in a first position.
Figure 2:
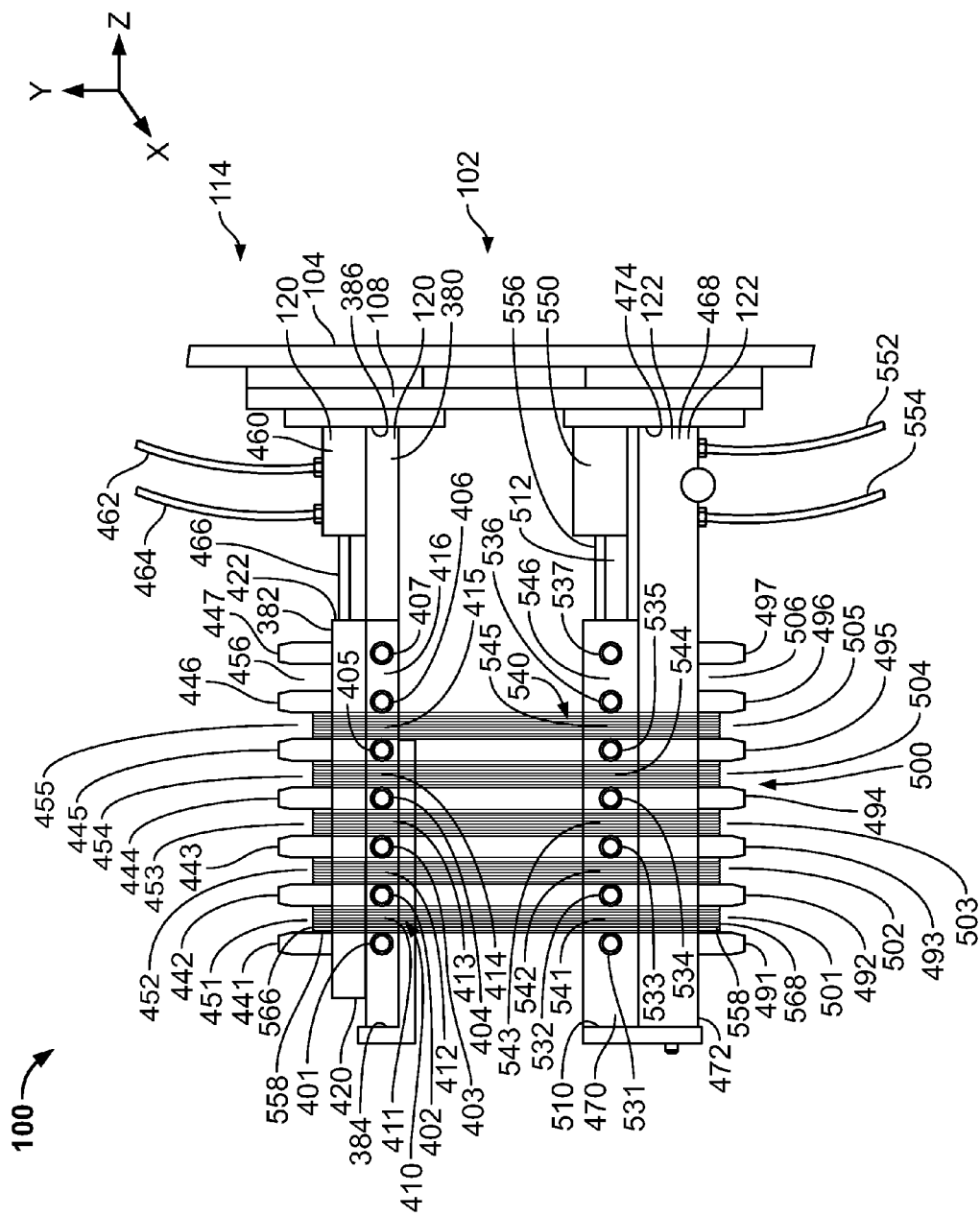
FIG. 2 is an opposite side elevational view of the coil forming apparatus shown in FIG. 1.
Figure 3:
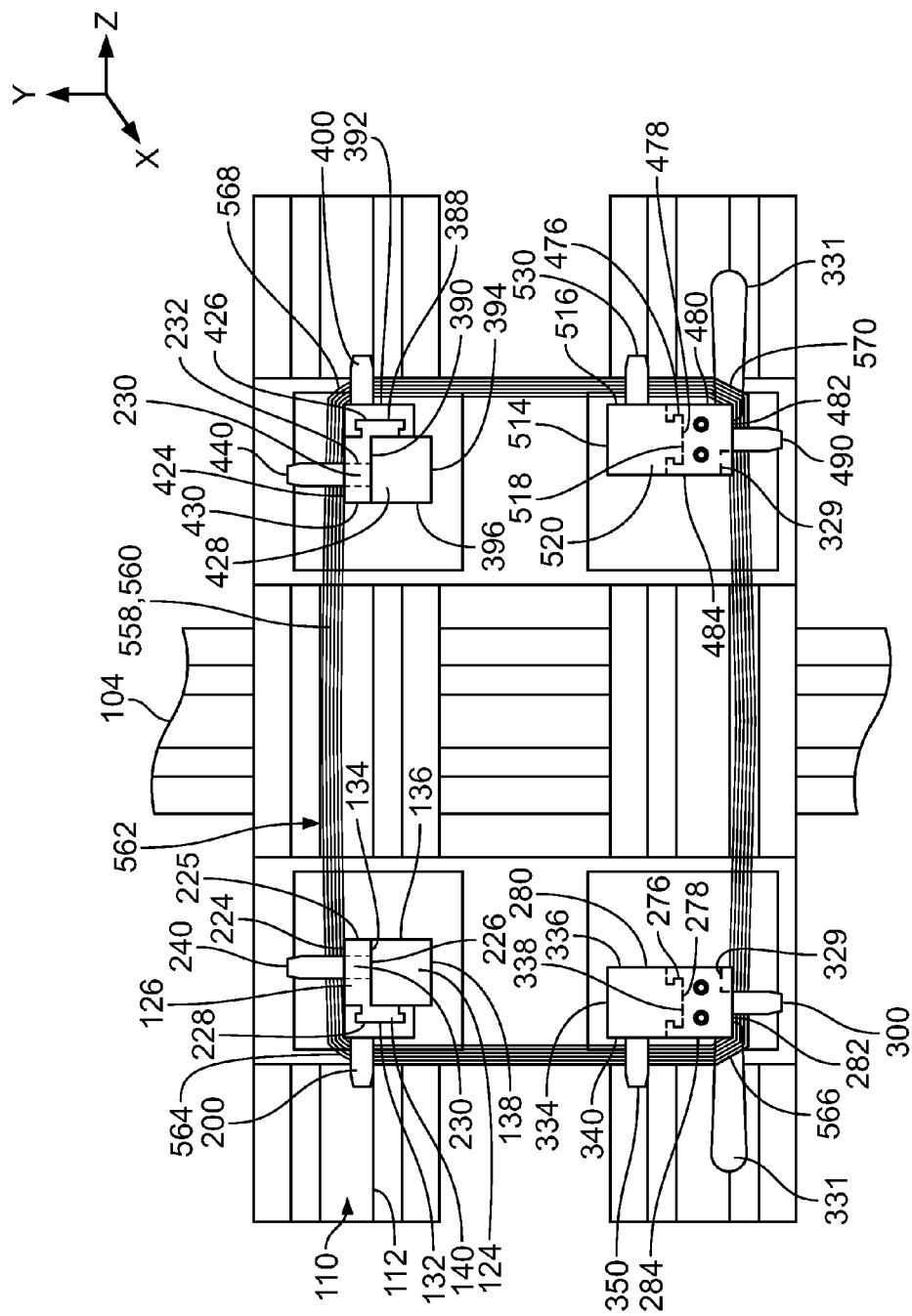
FIG. 3 is a front elevational view of the coil forming apparatus shown in FIG. 1.

FIG. 1 is a side elevational view of an exemplary coil forming apparatus 100 in a first position 102. FIG. 2 is an opposite side elevational view of coil forming apparatus 100 shown in FIG. 1. FIG. 3 is a front elevational view of coil forming apparatus 100 shown in FIG. 1. In the exemplary embodiment, three perpendicular axes X, Y and Z and associated X, Y and Z planes of reference are used to define a three-dimensional Cartesian coordinate system relative to coil forming apparatus 100. Coil forming apparatus 100 includes a frame 104, a first plate 106 and a second plate 108. A drive system 110 couples first plate 106 and second plate 108 to frame 104, wherein drive system 110 is configured to move first plate 106 and second plate 108 with respect to frame 104 and along X-axis. In the exemplary embodiment, drive system 110 includes a screw drive 112 coupled to first plate 106 and second plate 108. Alternatively, drive system 110 may include other drive configurations such as, for example, a rack and pinion drive, a pneumatic drive and a hydraulic drive. Drive system 110 can include any drive configuration to enable separate movement of first plate 106 and second plate 108 with respect to frame 104. Moreover, drive system 110 may enable movement of first plate 106 and second plate 108 with respect to frame 104 along Y-axis.

Coil forming apparatus 100 further includes a spindle assembly 114 coupled to first plate 106 and second plate 108. Spindle assembly 114 includes a first arm 116 and a second arm 118 coupled to first plate 106. First arm 116 and second arm 118 are coupled to first plate 106 and extend from first plate 106 away from frame 104 and along Z-axis. Moreover, first arm 116 and second arm 118 are parallel to each other in the direction of Y-axis. Spindle assembly 114 further includes a third arm 120 and a fourth arm 122 coupled to second plate 108. Third arm 120 and fourth arm 122 are coupled to second plate 108 and extend from second plate 108 away from frame 104 and along Z axis. Moreover, third arm 120 and fourth arm 122 are parallel to each other in the Y-axis. Still further, first arm 116 and third arm 120 are parallel to each other in the direction of X-axis and second arm 118 and fourth arm 122 are parallel to each other in the direction of X-axis.

First arm 116 includes a stationary bracket 124 coupled to first plate 106 and a moveable bracket 126 coupled to stationary bracket 124. Stationary bracket 124 includes a first end 128, a second end 130 and a track 132 located between first end 128 and second end 130. Track 132 is configured to couple to and guide moveable bracket 126 as moveable bracket 126 moves relative to stationary bracket 124 as described herein. Stationary bracket 124 further includes a first side 134, a second side 136, a third side 138 and a fourth side 140 located between first end 128 and second end 130.

A plurality of aligned first stationary spindles 200 is coupled to and along fourth side 140 at about a 90 degree angle relative to fourth side 140 and extend from fourth side 140 along X-axis. Alternatively, spindles 200 may couple to fourth side 140 at any angle to enable coil forming apparatus 100 to function as described herein. In the exemplary embodiment, the plurality of spindles 200 includes seven spindles 201, 202, 203, 204, 205, 206 and 207. Alternatively, the plurality of spindles 200 may include more than seven spindles 200 or less than seven spindles 200. Spindles 200 are separated to form a plurality of spaces 210 between adjacent spindles 200. In the exemplary embodiment, spaces 211, 212, 213, 214, 215 and 216 are formed between respective spindles 201, 202, 203, 204, 205, 206, 207.

Moveable bracket 126 includes a first end 220, a second end 222 and a first side 224, a second side 225, a third side 226 and a fourth side 228 located between first end 220 and second end 222. Sides 224, 225, 226, and 228 further define an internal cavity 230 between first end 220 and second end 222. Moveable bracket 126 includes a plurality of apertures 232 disposed through first side 224 and third side 226 and in communication with internal cavity 230. A plurality of aligned first moveable spindles 240 is coupled to and along first side 224 at about a 90 degree angle relative to first side 224 and extend from first side 224 along Y-axis. Alternatively, spindles 240 may couple to and extend from first side 224 at any angle to enable coil forming apparatus 100 to function as described herein. Spindles 240 are coupled to first side 224 and partially within apertures 232. In the exemplary embodiment, the plurality of spindles 240 includes seven spindles 241, 242, 243, 244, 245, 246 and 247. Alternatively, the plurality of spindles 240 may include more than seven spindles 240 and less than seven spindles 240. Spindles 240 are separated to form a plurality of spaces 250 between adjacent spindles 240. More particularly, spaces 250 are formed by respective spindles 241, 242, 243, 244, 245 and 246.

The plurality of spindles 200 of stationary bracket 124 is aligned in the same Z-planes and substantially orthogonal to the plurality of spindles 240 of moveable bracket 126. More particularly, spindle 201 is aligned with spindle 241; spindle 202 is aligned with spindle 242; spindle 203 is aligned with spindle 243; spindle 204 is aligned with spindle 244; spindle 205 is aligned with spindle 245; spindle 206 is aligned with spindle 246, and spindle 207 is aligned with spindle 247. Due to spindle alignment, the plurality of spaces 210 of stationary bracket 124 is aligned in the same Z-planes as the plurality of spaces 250 of moveable bracket 126. More particularly, space 211 is aligned with space 251; space 212 is aligned with space 252; space 213 is aligned with space 253; space 214 is aligned with space 254; space 215 is aligned with space 255, and space 216 is aligned with space 256.

A drive system 260 is coupled to moveable bracket 126. In the exemplary embodiment, drive system 260 is a pneumatic drive and includes an inlet port 262 and an outlet port 264, which are coupled to a piston 264. Piston 264 is coupled to moveable bracket 126. Inlet port 262 and outlet port 264 are coupled to a pressure source (not shown) via pneumatic tubes. Alternatively, drive system 260 may include other drive configurations such as, for example, a hydraulic drive system and a motorized gear system. Drive system 260 can include any configuration to enable coil forming apparatus 100 to function as described herein. Drive system 260 is configured to reciprocally slide moveable bracket 126 longitudinally within track 132 and along Z-axis.

Second arm 118 includes a stationary bracket 268 coupled to first plate 106 and a moveable bracket 270 coupled to stationary bracket 268. Stationary bracket 268 includes a first end 272, a second end 274 and a track 276 located between first end 272 and second end 274. Track 276 is configured to couple to and guide moveable bracket 270 as moveable bracket 270 moves relative to stationary bracket 268 as described herein. Stationary bracket 268 further includes a first side 278, a second side 280, a third side 282 and a fourth side 284 located between first end 272 and second end 274.

A plurality of aligned second stationary spindles 300 are coupled to third side 282 at about a 90 degree angle relative to third side 282 and extend from third side 282 along Y-axis. Alternatively, spindles 300 may couple to third side 282 at any angle to enable coil forming apparatus 100 to function as described herein. In the exemplary embodiment, the plurality of spindles 300 includes seven spindles 301, 302, 303, 304, 305, 306 and 307. Alternatively, the plurality of spindles 300 may include more than seven spindles 300 or less than seven spindles 300. Spindles 300 are separated to form a plurality of spaces 320 between adjacent spindles 300. In the exemplary embodiment, spaces 321, 322, 323, 324, 325 and 326 are formed between respective spindles 301, 302, 303, 304, 305, 306 and 307. Stationary bracket 268 includes a plurality of grooves 329 disposed within third side 282, wherein grooves 329 are positioned substantially orthogonal to the plurality of spindles 300. Spindles 300 are coupled to a handle 331 which is configured to rotate spindles 300 into grooves 329 as described herein.

Moveable bracket 270 includes a first end 330, a second end 332 and first side 334, a second side 336, a third side 338 and a fourth side 340 located between first end 330 and second end 332. A plurality of aligned second moveable spindles 350 are coupled to fourth side 340 at about a 90 degree angle relative to fourth side 340 and extend from fourth side 340 along X-axis. Alternatively, spindles 350 may couple to and extend from fourth side 340 at any angle to enable coil forming apparatus 100 to function as described herein. In the exemplary embodiment, the plurality of spindles 350 includes seven spindles 351, 352, 353, 354, 355, 356 and 357. Alternatively, the plurality of spindles 350 may include more than seven spindles 350 and less than seven spindles 350. Spindles 350 are separated to form a plurality of spaces 360 between adjacent spindles 350. More particularly, spaces 361, 362, 363, 364, 365 and 366 are formed by respective spindles 351, 352, 353, 354, 355, 356 and 357.

The plurality of spindles 300 of stationary bracket 268 is aligned in the same Z-planes and substantially orthogonal to the plurality of spindles 350 of moveable bracket 270. More particularly, spindle 301 is aligned with spindle 351; spindle 302 is aligned with spindle 352; spindle 303 is aligned with spindle 353; spindle 304 is aligned with spindle 354; spindle 305 is aligned with spindle 355; spindle 306 is aligned with spindle 356, and spindle 307 is aligned with spindle 357. Due to spindle alignment, the plurality of spaces 320 of stationary bracket 268 is aligned in the same Z-planes as the plurality of spaces 360 of moveable bracket 270. More particularly, space 321 is aligned with space 361; space 322 is aligned with space 362; space 323 is aligned with space 363; space 324 is aligned with space 364; space 325 is aligned with space 365, and space 326 is aligned with space 366.

A drive system 370 is coupled to moveable bracket 270. In the exemplary embodiment, drive system 370 is a pneumatic drive and includes an inlet port 372 and an outlet port 374, which are coupled to a piston 376. Piston 376 is coupled to moveable bracket 270. Inlet port 372 and outlet port 374 are coupled to a pressure source (not shown) via pneumatic tubes. Alternatively, drive system 370 may include other drive configurations such as, for example, a hydraulic drive system 370 and a motorized gear system. Drive system 370 can include any configuration to enable coil forming apparatus 100 to function. Drive system 370 is configured to reciprocally slide moveable bracket 270 longitudinally within track 276 and along Z-axis.

Third arm 120 includes a stationary bracket 380 coupled to second plate 108 and a moveable bracket 382 coupled to stationary bracket 380. Stationary bracket 380 includes a first end 384, a second end 386 and a track 388 located between first end 384 and second end 386. Track 388 is configured to couple to and guide moveable bracket 382 as moveable bracket 382 moves relative to stationary bracket 380 as described herein. Stationary bracket 380 further includes a first side 390, a second side 392, a third side 394 and a fourth side 396 located between first end 384 and second end 386.

A plurality of aligned third stationary spindles 400 are coupled to second side 392 at about a 90 degree angle relative to second side 392 and extend from second side 392 along X-axis. Alternatively, spindles 400 may couple to second side 392 at any angle to enable coil forming apparatus 100 to function as described herein. In the exemplary embodiment, the plurality of spindles 400 includes seven spindles 401, 402, 403, 404, 405, 406 and 407. Alternatively, the plurality of spindles 400 may include more than seven spindles 400 or less than seven spindles 400. Spindles 401, 402, 403, 404, 405, 406 and 407 are separated to form a plurality of spaces 410 between adjacent spindles 400. In the exemplary embodiment, spaces 411, 412, 413, 414, 415 and 416 are formed between respective spindles 401, 402, 403, 404, 405, 406 and 407.

Moveable bracket 382 includes a first end 420, a second end 422 and a first side 424, a second side 426, a third side 428 and a fourth side 430 located between first end 420 and second end 422. Sides 424, 426, 428, and 430 further define an internal cavity 230 between first end 420 and second end 422. Moveable bracket 382 includes a plurality of apertures 232 disposed through first side 424 and third side 428 and in communication with internal cavity 230. A plurality of aligned third moveable spindles 440 is coupled to and along first side 424 at about a 90 degree angle relative to first side 424 and extend from first side 424 along Y-axis. Alternatively, spindles 440 may couple to and extend from first side 424 at any angle to enable coil forming apparatus 100 to function as described herein. Spindles 440 are coupled to first side 424 and partially within apertures 232. In the exemplary embodiment, the plurality of spindles 440 includes seven spindles 441, 442, 443, 444, 445, 446 and 447. Alternatively, the plurality of spindles 440 may include more than seven spindles 440 and less than seven spindles 440. Spindles 441, 442, 443, 444, 445, 446 and 447 are separated to form a plurality of spaces 450 between adjacent spindles 440. More particularly, spaces 451, 452, 453, 454, 455 and 456 are formed by respective spindles 441, 442, 443, 444, 445, 446 and 447.

The plurality of spindles 400 of stationary bracket 380 is aligned in the same Z-planes and substantially orthogonal to the plurality of spindles 440 of moveable bracket 382. More particularly, spindle 401 is aligned with spindle 441; spindle 402 is aligned with spindle 442; spindle 403 is aligned with spindle 443; spindle 404 is aligned with spindle 444; spindle 405 is aligned with spindle 445; spindle 406 is aligned with spindle 446, and spindle 407 is aligned with spindle 447. Due to spindle alignment, the plurality of spaces 410 of stationary bracket 380 is aligned in the same Z-planes as the plurality of spaces 450 of moveable bracket 382. More particularly, space 411 is aligned with space 451; space 412 is aligned with space 452; space 413 is aligned with space 453; space 414 is aligned with space 454; space 415 is aligned with space 455, and space 416 is aligned with space 456.

A drive system 460 is coupled to moveable bracket 382. In the exemplary embodiment, drive system 460 is a pneumatic drive and includes an inlet port 462 and an outlet port 464, which are coupled to a piston 466. Piston 466 is coupled to moveable bracket 382. Inlet port 462 and outlet port 464 are coupled to a pressure source (not shown) via pneumatic tubes. Alternatively, drive system 460 may include other drive configurations such as, for example, a hydraulic drive system 460 and a motorized gear system. Drive system 460 can include any configuration to enable coil forming apparatus 100 to function. Drive system 460 is configured to reciprocally slide moveable bracket 382 longitudinally within track 388 and along Z-axis.

Fourth arm 122 includes a stationary bracket 468 coupled to second plate 108 and a moveable bracket 470 coupled to stationary bracket 468. Stationary bracket 468 includes a first end 472, a second end 474 and a track 476 located between first end 472 and second end 474. Track 476 is configured to couple to and guide moveable bracket 470 as moveable bracket 470 moves relative to stationary bracket 468 as described herein. Stationary bracket 468 further includes a first side 478, a second side 480, a third side 482 and a fourth side 484 located between first end 472 and second end 474.

A plurality of aligned fourth stationary spindles 490 are coupled to third side 482 at about a 90 degree angle relative to third side 482 and extend from third side 482 along Y-axis. Alternatively, spindles 490 may couple to third side 482 at any angle to enable coil forming apparatus 100 to function as described herein. In the exemplary embodiment, the plurality of spindles 490 includes seven spindles 491, 492, 493, 494, 495, 496 and 497. Alternatively, the plurality of spindles 490 may include more than seven spindles 490 or less than seven spindles 490. Spindles 491, 492, 493, 494, 495, 496 and 497 are separated to form a plurality of spaces 500 between adjacent spindles 490. In the exemplary embodiment, spaces 501, 502, 503, 504, 505 and 506 are formed between respective spindles 490. Stationary bracket 468 includes a plurality of grooves 329 disposed within third side 482, wherein grooves 329 are positioned substantially orthogonal to the plurality of spindles 490. Spindles 490 are coupled to a handle 331 which is configured to rotate spindles 490 into grooves 329 as described herein.

Moveable bracket 470 includes a first end 510, a second end 512 and first side 514, a second side 516, a third side 518 and a fourth side 520 located between first end 510 and second end 512. A plurality of aligned fourth moveable spindles 530 are coupled to second side 516 at about a 90 degree angle relative to second side 516 and extend from second side 516 along X-axis. Alternatively, spindles 530 may couple to and extend from third side 518 at any angle to enable coil forming apparatus 100 to function as described herein. In the exemplary embodiment, the plurality of spindles 530 includes seven spindles 531, 532, 533, 534, 535, 536 and 537. Alternatively, the plurality of spindles 530 may include more than seven spindles 530 and less than seven spindles 530. Spindles 531, 532, 533, 534, 535, 536 and 537 are separated to form a plurality of spaces 540 between adjacent spindles 530. More particularly, spaces 541, 542, 543, 544, 545 and 546 are formed by respective spindles 531, 532, 533, 534, 535, 536 and 537.

The plurality of spindles 490 of stationary bracket 468 is aligned in the same Z-planes and substantially orthogonal to the plurality of spindles 530 of moveable bracket 470. More particularly, spindle 491 is aligned with spindle 531; spindle 492 is aligned with spindle 532; spindle 493 is aligned with spindle 533; spindle 494 is aligned with spindle 534; spindle 495 is aligned with spindle 535; spindle 496 is aligned with spindle 536, and spindle 497 is aligned with spindle 537. Due to spindle alignment, the plurality of spaces 500 of stationary bracket 468 is aligned in the same Z-planes as the plurality of spaces 540 of moveable bracket 470. More particularly, space 501 is aligned with space 541; space 502 is aligned with space 542; space 503 is aligned with space 543; space 504 is aligned with space 544; space 505 is aligned with space 545, and space 506 is aligned with space 546.

A drive system 550 is coupled to moveable bracket 470. In the exemplary embodiment, drive system 550 is a pneumatic drive and includes an inlet port 552 and an outlet port 554, which are coupled to a piston 556. Piston 556 is coupled to moveable bracket 470. Inlet port 552 and outlet port 554 are coupled to a pressure source (not shown) via pneumatic tubes. Alternatively, drive system 550 may include other drive configurations such as, for example, a hydraulic drive system 550 and a motorized gear system. Drive system 550 can include any configuration to enable coil forming apparatus 100 to function. Drive system 550 is configured to reciprocally slide moveable bracket 470 longitudinally within track 476 and along Z-axis.

In first position 102 (shown in FIGS. 1-3), the pluralities of spindles 200, 240, 300, 350, 400, 440, 490 and 530 are aligned in respective Z-planes. More particularly, spindles 201, 241, 301, 351, 401, 441, 491 and 531 are aligned in a Z-plane. Spindles 202, 242, 302, 352, 402, 442, 492 and 532 are aligned in a Z-plane. Spindles 203, 243, 303, 353, 403, 443, 493 and 533 are aligned in a Z-plane. Moreover, spindles 204, 244, 304, 354, 404, 444, 494 and 534 are aligned in a Z-plane. Spindles 205, 245, 305, 355, 405, 445, 495 and 535 are aligned in a Z-plane. Spindles 206, 246, 306, 356, 406, 446, 496 and 536 are aligned in a Z-plane. Still further, spindles 207, 247, 307, 357, 407, 447, 497 and 537 are aligned in a Z-plane.

A plurality of electrical wires 558 (shown in FIGS. 1-3) is coupled to and around coil forming apparatus 100. In particular, electrical wires 558 are coupled, under tension, to first arm 116 and second arm 118 and to third arm 120 and fourth arm 122. Each electrical wire 558 includes an insulating coating 560. Electrical wires 558 are positioned within spaces wherein the pluralities of spindles 200, 240, 300, 350, 400, 440, 490 and 530 couple to and segregate electrical wires 558 into separate bundles 562 along Z-axis. Since bundles 562 are coupled to first arm 116, second arm 118 and to third arm 120 and fourth arm 122, each bundle 562 includes a first corner bend 564 at first arm 116, a second corner bend 566 at second arm 118 and includes a third corner bend 568 at third arm 120 and a fourth corner bend 570 at fourth arm 122. In the exemplary embodiment, bends 564, 566, 568 and 570 include about a 90 degree angle relative to Z-axis. Alternatively, bends 564, 566, 568 and 570 may include any angle to enable electrical wire to function as described herein. Electrical wire 558 includes a conductive material such as copper and is rectangular in cross section. Alternatively, electrical wire 558 may include other conductive materials such as, for example, aluminum, gold, silver and can include other cross sectional shapes such as round and square.

Figure 4:
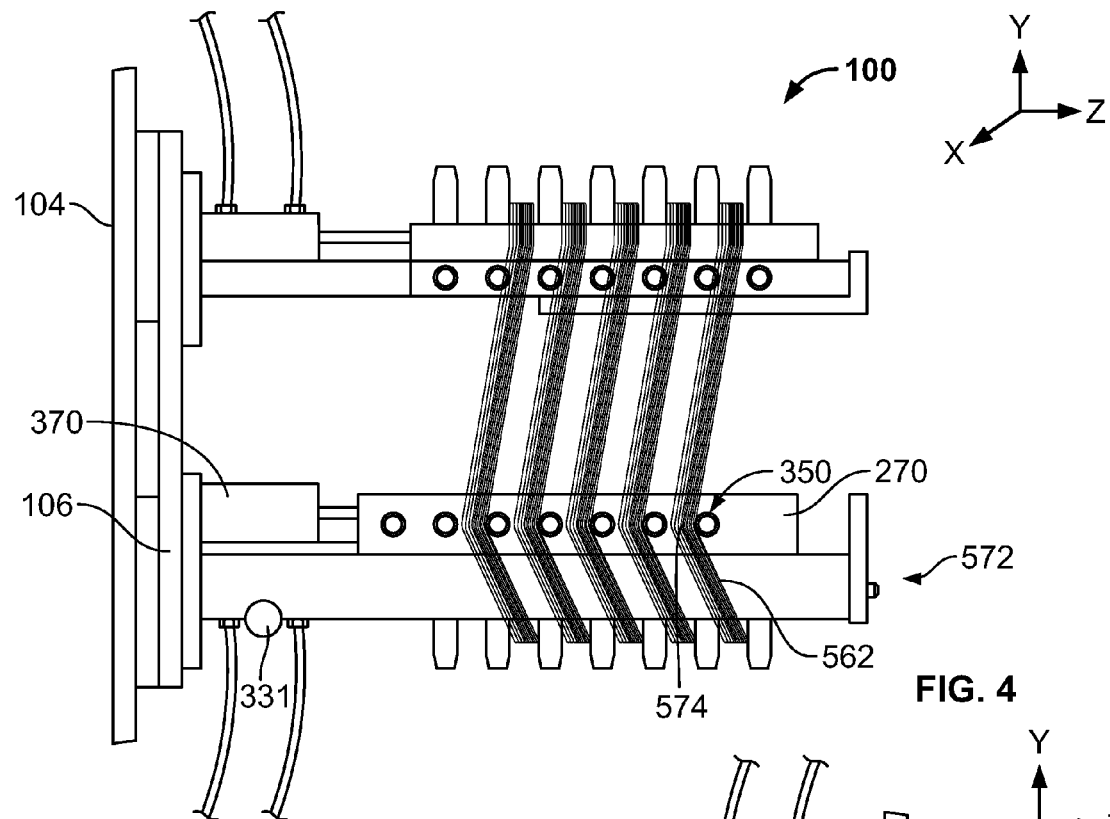
FIG. 4 is a side elevational view of the coil forming apparatus shown in a second position.
Figure 5:
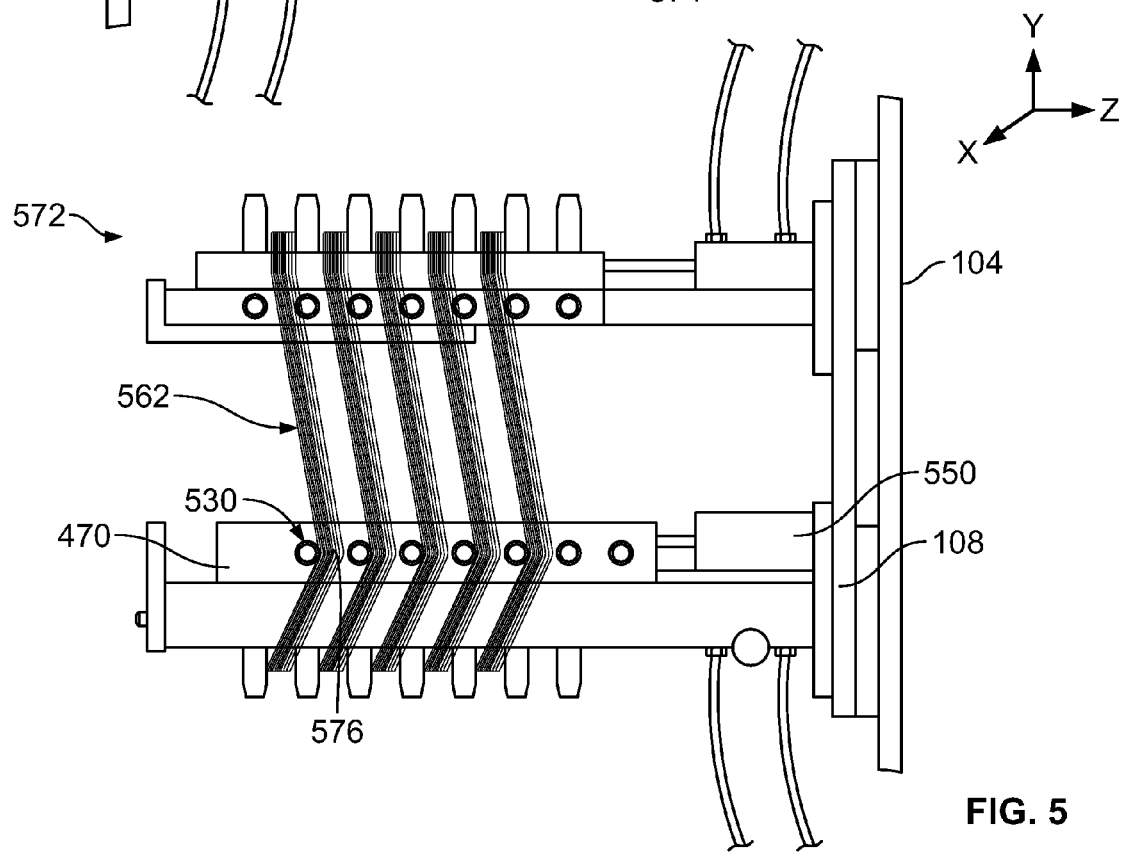
FIG. 5 is an opposite side elevational view of the coil forming apparatus shown in FIG. 4.
Figure 6:
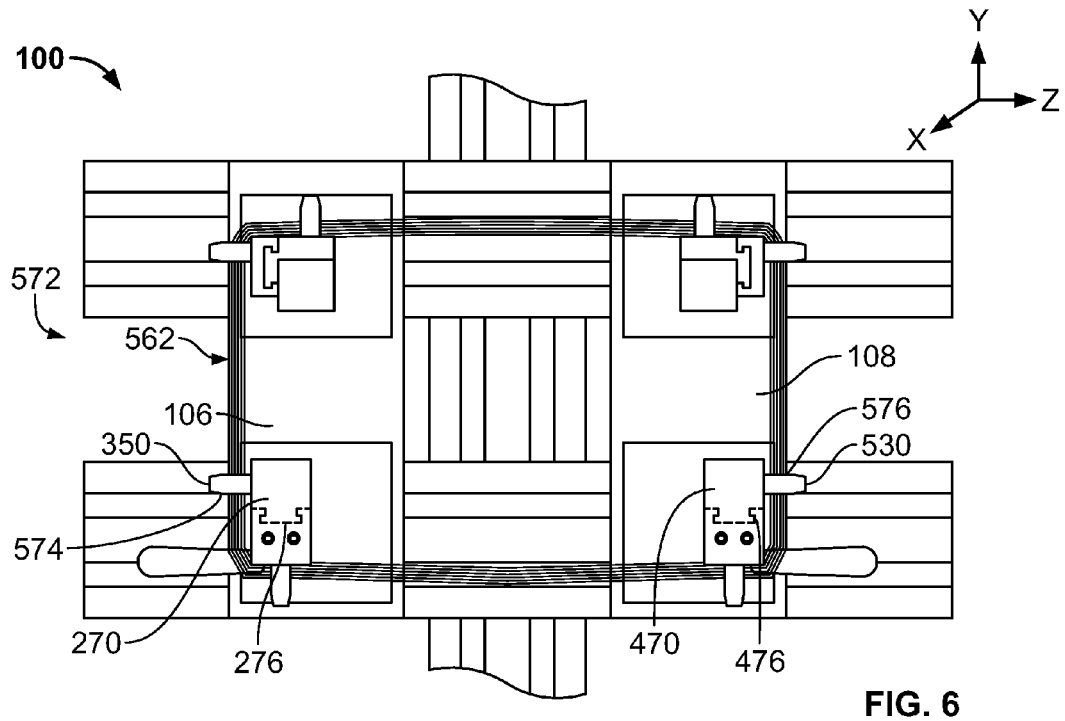
FIG. 6 is a front elevational view of the coil forming apparatus shown in FIG. 4.

FIG. 4 is a side elevational view of coil forming apparatus 100 in a second position 572. FIG. 5 illustrates an opposite side elevational view of coil forming apparatus 100 shown in FIG. 4. FIG. 6 illustrates a front elevational view of coil forming apparatus 100 shown in FIG. 4. In second position 572, drive system 370 slides moveable bracket 270 longitudinally within track 276. More particularly, drive system 370 moves moveable bracket 270 along Z-axis and toward first plate 106. The plurality of first moveable spindles 350 moves with moveable bracket 270 and toward first plate 106. In second position 572, the plurality of spindles 350 is shifted along Z-axis. During movement of the plurality of spindles 350, spindles 350 couple to bundles 562 and preform bundles 562. In the exemplary embodiment, spindles 350 preform bundles 562 by pushing bundles 562 toward first plate 106. More particularly, spindles 350 facilitate forming a first bend 574 within each bundle 562. In the exemplary embodiment, bend 574 includes about a 45 degree angle relative to Z-axis. Alternatively, moveable bracket 270 may move toward first plate 106 to facilitate spindles 350 preforming bends 574 in bundles 562 at angles less than 45 degrees and at angles greater than 45 degrees.

Moreover, in second position 572, drive system 550 slides moveable bracket 470 longitudinally within track 476. More particularly, drive system 550 moves moveable bracket 470 along Z-axis and toward second plate 108. The plurality of fourth moveable spindles 530 moves with moveable bracket 470 and toward second plate 108. In second position 572, the plurality of spindles 530 is shifted along Z-axis. During movement of the plurality of spindles 530, spindles 530 couple to bundles 562 and preform bundles 562. In the exemplary embodiment, spindles 530 preform bundles 562 by pushing bundles 562 toward second plate 108. More particularly, spindles 530 facilitate forming second bend 576 within each bundle 562. In the exemplary embodiment, bend 576 includes about a 45 degree angle relative to Z-axis. Alternatively, moveable bracket 470 may move toward second plate 108 to facilitate spindles 530 performing bends 576 in bundles 562 at angles less than 45 degrees and at angles greater than 45 degrees. In second position 572, the pluralities of spindles 350 and spindles 530 are moved toward frame 104 and are unaligned in different Z-planes with the pluralities of spindles 200, 240, 300, 350, 400, 440 and 490 as compared to first position 102 (shown in FIG. 1).

Figure 7:
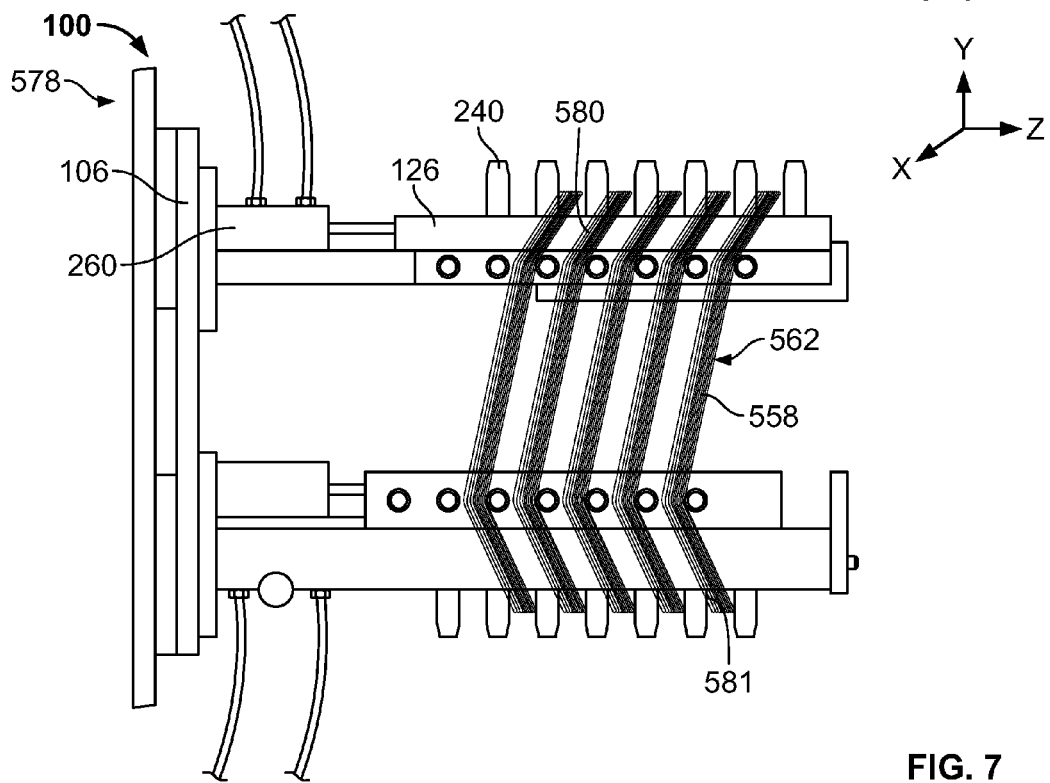
FIG. 7 is a side elevational view of the coil forming apparatus shown in a third position.
Figure 8:
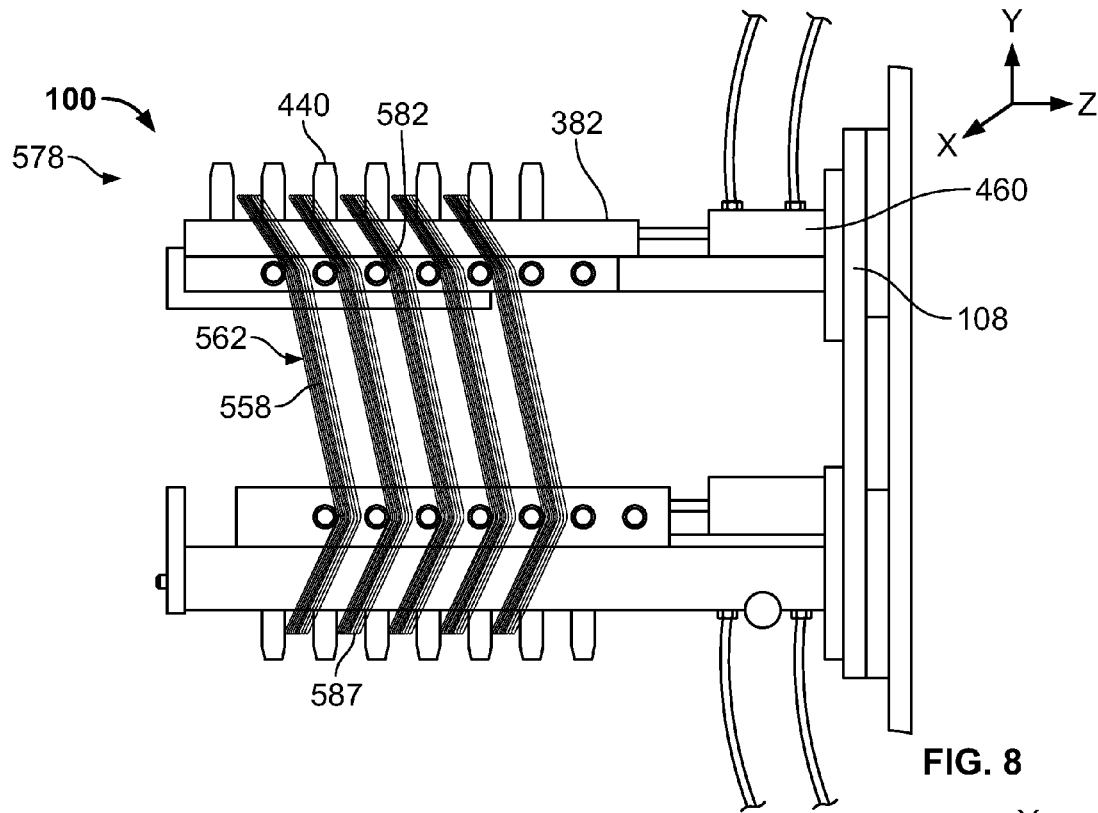
FIG. 8 is an opposite side view of the coil forming apparatus shown in FIG. 7.
Figure 9:
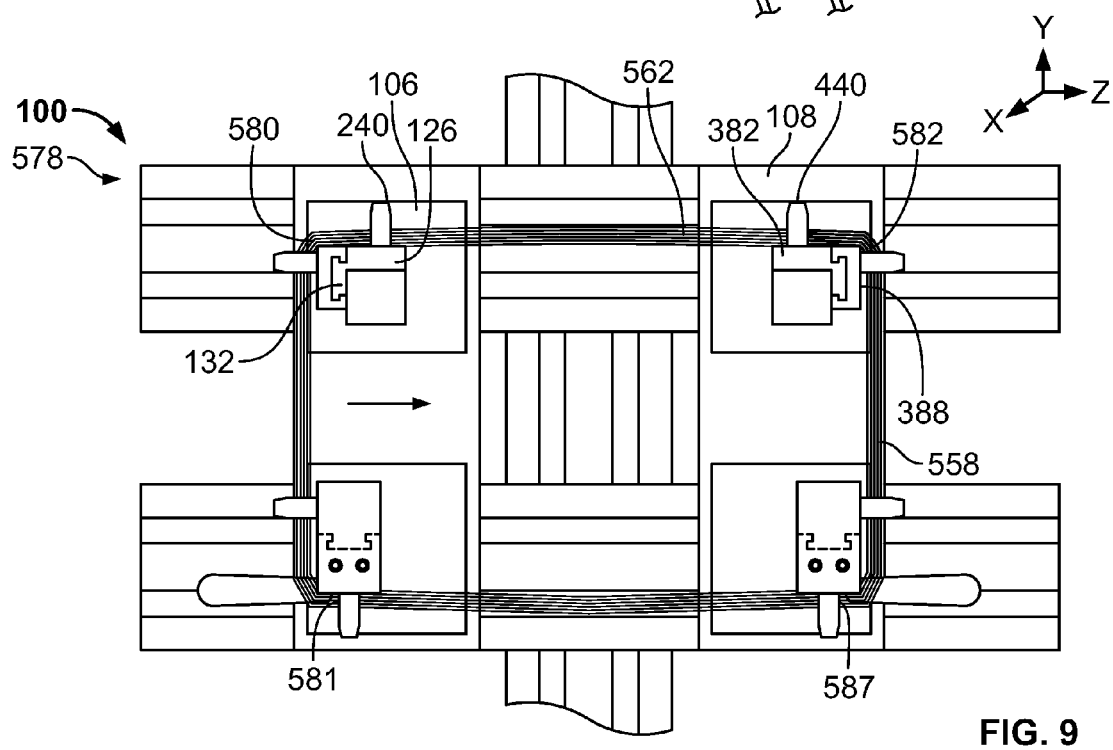
FIG. 9 is a front elevational view of the coil forming apparatus shown in FIG. 7.

FIG. 7 is a side elevational view of coil forming apparatus 100 in a third position 578. FIG. 8 is an opposite side view of coil forming apparatus 100 shown in FIG. 7. FIG. 9 illustrates a front elevational view of coil forming apparatus 100 shown in FIG. 7. In third position 578, drive system 110 moves first plate 106 along X-axis and toward but spaced from second plate 108. Alternatively, drive system 110 may move second plate 108 along X-axis and toward but spaced from first plate 106. In third position 578, drive system 110 moves first plate 106 and or second plate 108 along X-axis to reduce or minimize tension within bundles 562.

In third position 578, drive system 260 slides moveable bracket 126 longitudinally within track 132. More particularly, drive system 260 moves moveable bracket 126 along Z-axis and away from first plate 106. The plurality of first moveable spindles 240 moves with moveable bracket 126 and away from first plate 106. In third position 578, the plurality of spindles 240 is shifted along Z-axis. During movement of the plurality of spindles 240, spindles 240 couple to bundles 562 and preform bundles 562. In the exemplary embodiment, spindles 240 preform bundles 562 by pushing bundles 562 away from first plate 106. More particularly, spindles 240 facilitate forming third bend 580 within each bundle 562. In the exemplary embodiment, bend 580 includes about a 45 degree angle relative to Z-axis. Alternatively, moveable bracket 126 may move away from first plate 106 to facilitate spindles 240 preforming bends 580 in bundles 562 at angles less than 45 degrees and at angles greater than 45 degrees.

Moreover, in third position 578, drive system 460 slides moveable bracket 382 longitudinally within track 388. More particularly, drive system 460 moves moveable bracket 382 along Z-axis and away from second plate 108. The plurality of third moveable spindles 440 moves with moveable bracket 382 and away from second plate 108. In third position 578, the plurality of spindles 440 is shifted along Z-axis. During movement of the plurality of spindles 440, spindles 440 couple to bundles 562 and preform bundles 562. In the exemplary embodiment, spindles 440 preform bundles 562 by pushing bundles 562 away from second plate 108. More particularly, spindles 440 facilitate forming fourth bend 582 within each bundle 562. In the exemplary embodiment, bend 582 includes about a 45 degree angle relative to Z-axis. Alternatively, moveable bracket 382 may move away from second plate 108 to facilitate spindles 440 preforming bends 582 in bundles 562 at angles less than 45 degrees and at angles greater than 45 degrees. In third position 584, the pluralities of spindles 240 and spindles 490 are moved away from frame 104 and unaligned in different Z-planes with the pluralities of spindles 200, 300, 350, 400, 440 and 530 as compared to first position 102 (shown in FIG. 1).

In at least one of first position 102, second position 572 and third position 578, spindles 300 which extend beyond third side 282 of stationary bracket 268 are configured to form at least one intermediate bend 581 in each electrical wire 558. Further, in at least one of first position 102, second position 572 and third position 578, spindles 490 which extend beyond third side 482 of stationary bracket 468 are configured to form at least one intermediate bend 587 in each electrical wire 558.

Figure 10:
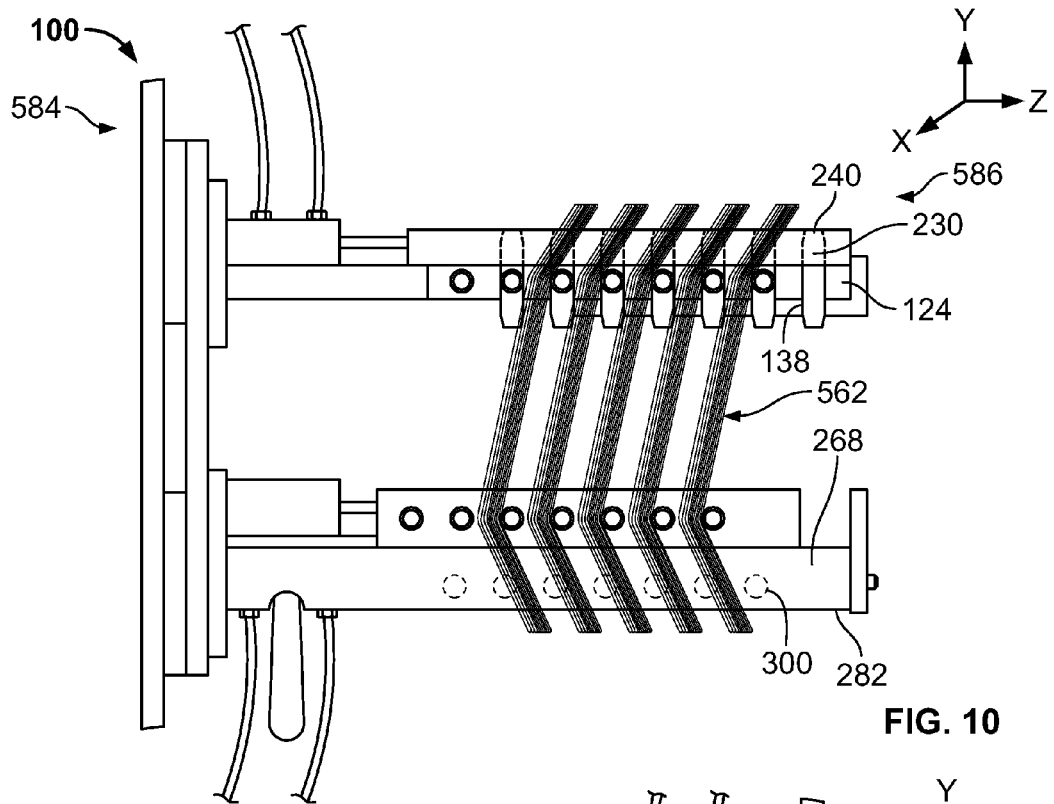
FIG. 10 is a side elevational view of the coil forming apparatus shown in a fourth position.
Figure 11:
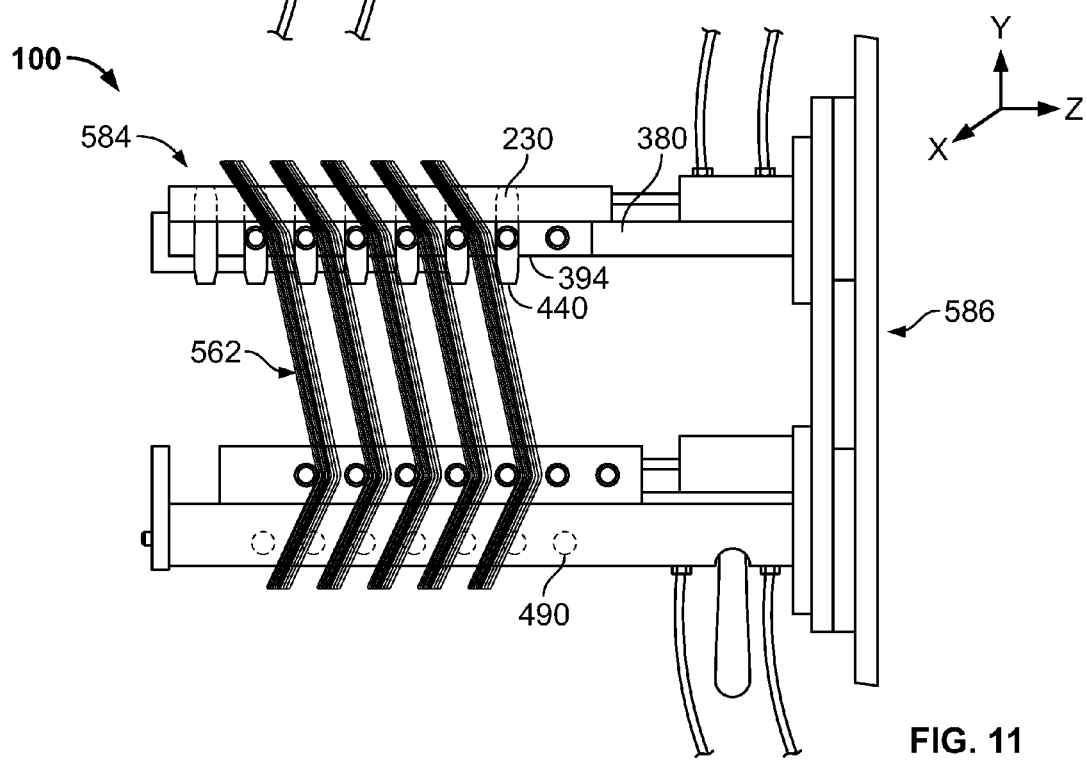
FIG. 11 is an opposite side elevational view of the coil forming apparatus shown in FIG. 10.
Figure 12:
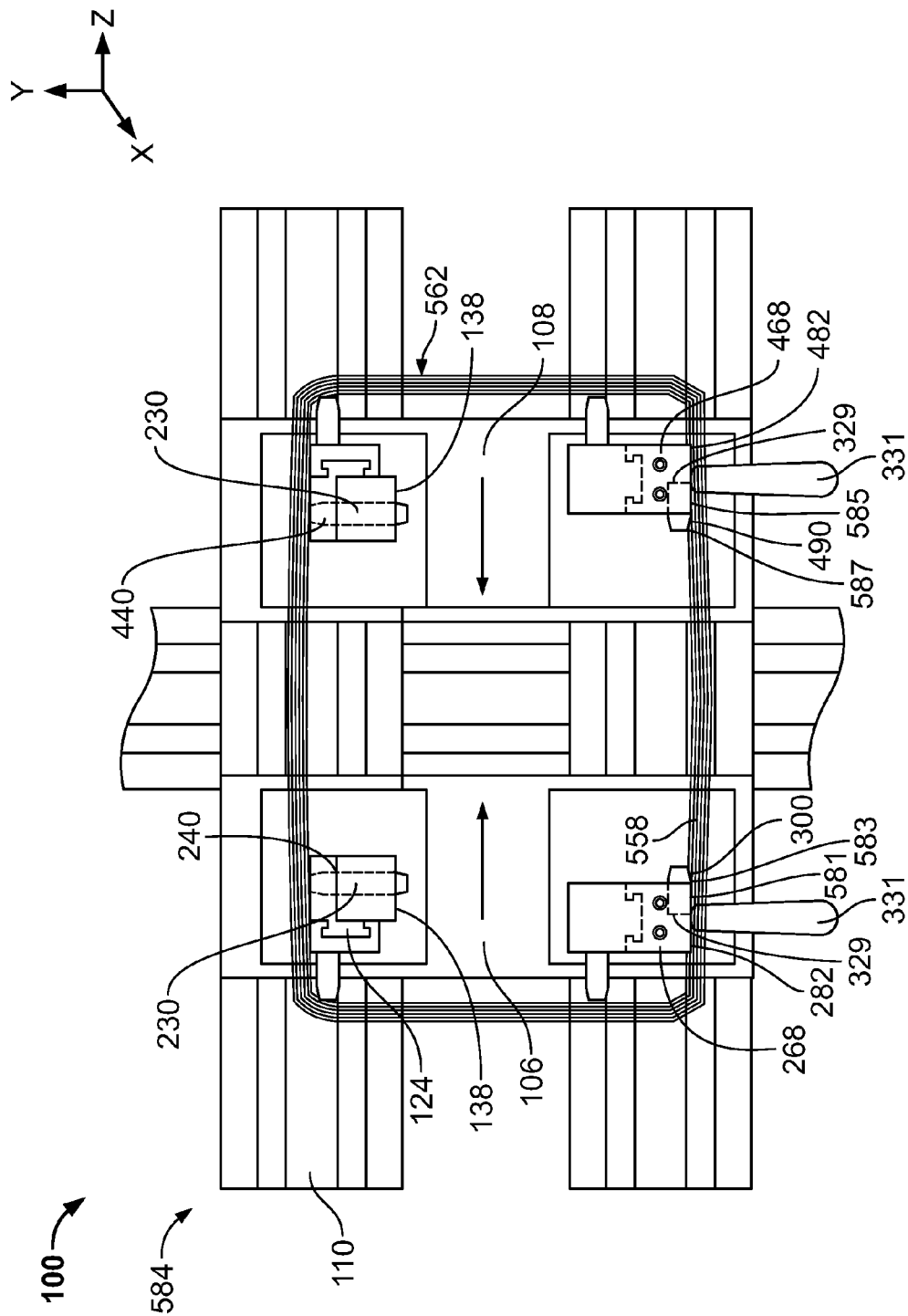
FIG. 12 is a front elevational view of the coil forming apparatus shown in FIG. 10.

FIG. 10 is a side elevational view of coil forming apparatus 100 in a fourth position 584. FIG. 11 is an opposite side elevational view of coil forming apparatus 100 shown in FIG. 10. FIG. 12 illustrates a front elevational view of coil forming apparatus 100 shown in FIG. 10. In fourth position 584, drive assembly 110 moves first plate 106 and second plate 108 along X-axis toward each other to facilitate releasing tension applied to the pluralities of bundles 562, wherein bundles 562 are shown partially released from tool 100. In fourth position 584, the plurality of spindles 240 are moved to a retracted position 586. More particularly, the plurality of spindles 240 are moved within cavity 230 and partially extend beyond third side 138 of stationary bracket 124. Additionally, in fourth position 584, the plurality of spindles 440 are moved to retracted position 586. More particularly, the plurality of spindles 440 are moved within cavity 230 and partially extend beyond third side 394 stationary bracket 380

In the exemplary embodiment, spindles 240 and spindles 440 are moved to retracted position 586 under force, applied by a user (not shown), to spindles 240 and spindles 440. More particularly, the user pushes spindles 240 and spindles 440 downward and into cavity 230. Alternatively, spindles 240 and spindles 440 may be automatically moved to retracted position 586 by a powered drive system. Any configuration for applying force may be used to move spindles 240 and spindles 440 to retracted position 586.

Moreover, in fourth position 584, spindles 300 and spindles 490 are moved to retracted position 586. More particularly, spindles 300 and spindles 490 are rotated within the plurality of grooves 329 which are sized and shaped to receive spindles 300 and spindles 490. In the exemplary embodiment, spindles 300 and spindles 490 are rotated to retracted position 586 under force, applied by the user, to spindle 300 and spindles 490. More particularly, user rotates handles 331 that are coupled to spindles 300 and spindles 490 respectively. Alternatively, spindles 300 and spindles 490 may be automatically moved to retracted position 586 by a powered drive system 110. Any configuration for applying force may be used to move spindles 300 and spindles 490 to retracted position 586. Alternatively, in retracted position 586, at least a portion of spindles 300 may extend beyond third side 282 of stationary bracket 268 to form another intermediate bend (not shown) in each electrical wire 558. Further, in retracted position 586, at least a portion of spindles 490 extends beyond third side 482 of stationary bracket 468 to form another intermediate bend (not shown) in each electrical wire 558. Moreover, in retracted position 586, spindles 240, 440 and spindles 300, 490 are decoupled from bundles 562 to facilitate removal of bundles 562 from coil forming apparatus 100 to enable unloading of bundles 562 from coil forming apparatus 100. Spindles 200, 350, 400 and 530 remain coupled to bundles 562 to separate bundles 562 to facilitate grasping each bundle 562 while removing each bundle 562 from coil forming apparatus 100.

Figure 13:
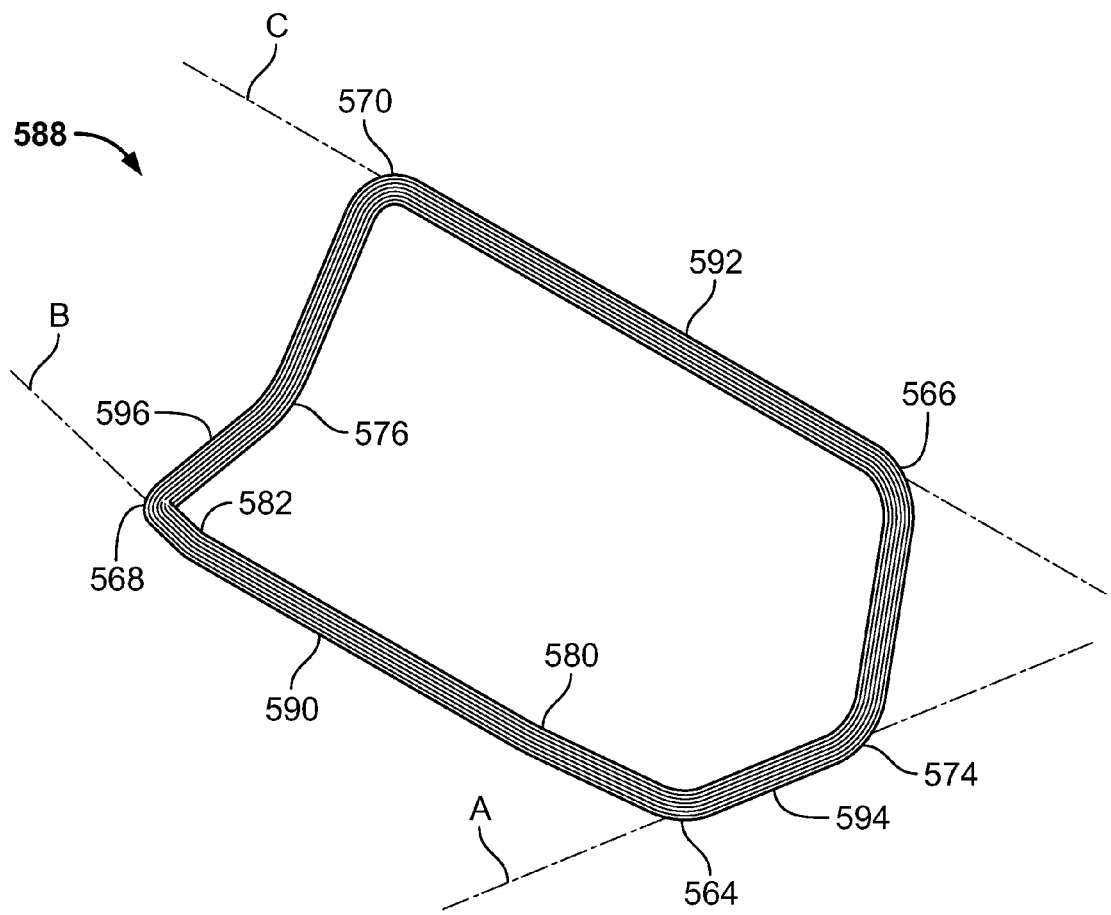
FIG. 13 is a perspective view of an exemplary electrical coil formed by the coil forming apparatus shown in FIG. 1.
Figure 14:
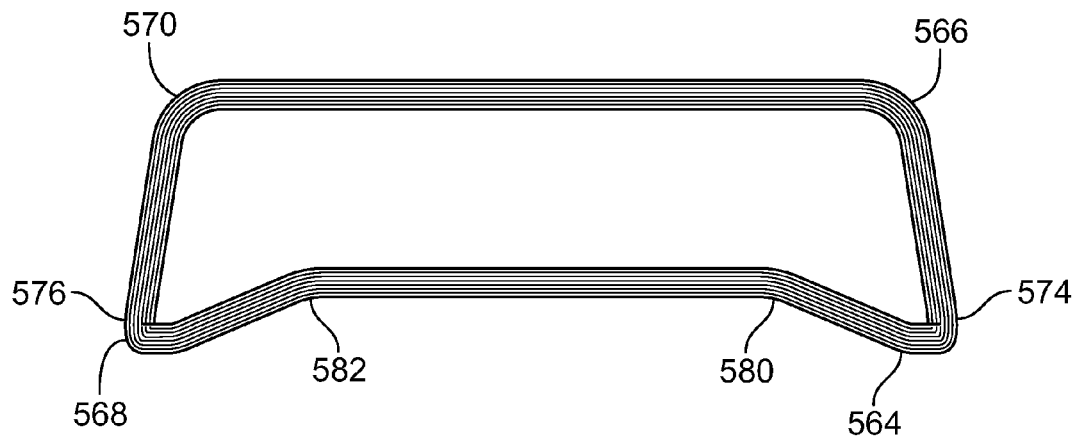
FIG. 14 is a front elevational view of the exemplary electrical coil shown in FIG. 13.

FIG. 13 is a perspective view of an electrical coil 588 formed from bundle 562 (shown in FIG. 12) now removed from coil forming apparatus 100. FIG. 14 is a front elevational view of electrical coil 588 shown in FIG. 13. Electrical coil 588 includes a first straight segment 590 and an opposite second straight segment 592. Moreover, electrical coil 588 includes a first end turn 594 and an opposite second end turn 596. Electrical coil 588 further includes second corner bend 566 located between second straight segment 592 and first end turn 594, wherein bend 566 includes a substantially 90 degree angle relative to second straight segment 592 and first end turn 594. First end turn 594 includes first bend 574 located between first straight segment 590 and second straight segment 592, wherein bend 576 includes a substantially 45 degree angle.

Electrical coil 588 further includes first corner bend 564 and third bend 580 between first end turn 594 and first straight segment 590. Bend 564 includes a substantially 90 degree angle relative to first end turn 594 and first straight segment 590 and third bend 580 includes a substantially 45 degree angle relative to first end turn 594 and first straight segment 590. In the exemplary embodiment, electrical coil 588 includes third corner bend 568 and fourth bend 582 located between first straight segment 590 and second end turn 596. Fourth bend 582 includes a substantially 45 degree angle relative to first straight segment 590 and second end turn 596 and third corner bend 568 includes a substantially 90 degree angle relative to first straight segment 590 and second end turn 596. Second end turn 596 includes second bend 576 which includes a substantially 45 degree angle. Fourth corner bend 570 is located between second end turn 596 and second straight segment 592, wherein bend 570 includes a substantially 90 degree angle relative to second end turn 596 and second straight segment 592. Alternatively, bends 564, 566, 568, 570, 574, 576, 580, and 582 may include any angle to enable electrical coil 588 to function as described herein.

Bends 564, 566, 568, 570, 574, 576, 580, 582, 581 and 587 in electrical coil 588 facilitate reducing size and weight of electrical coil 588. The length of first straight segment 590 is different than at least one of second straight segment 592, first end turn 594 and second end turn 596. More particularly, first straight segment 590 has a shorter length than at least one of first straight segment 590, first end turn 594 and second end turn 596. Moreover, first end turn 594 and second end turn 596 have a shorter length than second straight segment 592. The reduction of length of at least one of first straight segment 590, second straight segment 592, first end turn 594 and second end turn 596 minimizes losses such as resistive losses and thermal losses, which increases the efficiency of electrical coil 588. Further, the reduction of length of at least one of first straight segment 590, second straight segment 592, first end turn 594 and second end turn 596 minimizes needed material such as copper, which reduces the cost of electrical coil 588.

Moreover, bends 564, 566, 568, 570, 574, 576, 580, 582, 581 and 587 are configured to position first end turn 594 and second end turn 596 in different planes than first straight segment 590 and second straight segment 592. More particularly, first end turn 594 extends in a first plane A. Second end turn 596 extends parallel to first end turn 594 in first plane A. Due to at least third bend 580 and fourth bend 582, first straight segment 590 extends in a second plane B which is different than first plane A. Further, due to at least first bend 574 and second bend 576, second straight segment 592 extends in a third plane C that is different than first plane A and second plane B. Alternatively, bends 574, 576, 580 and 582 may be angled to position first straight segment 590 and second straight segment 592 in the same plane. Still further, bends 564, 566, 568, 570, 574, 576, 580, 582, 581 and 587 of electrical coil 588 are sized, shaped and positioned within electrical coil 588 to facilitate efficient coupling of electrical coil 588 to other adjacent electrical coils 588.

Figure 15:
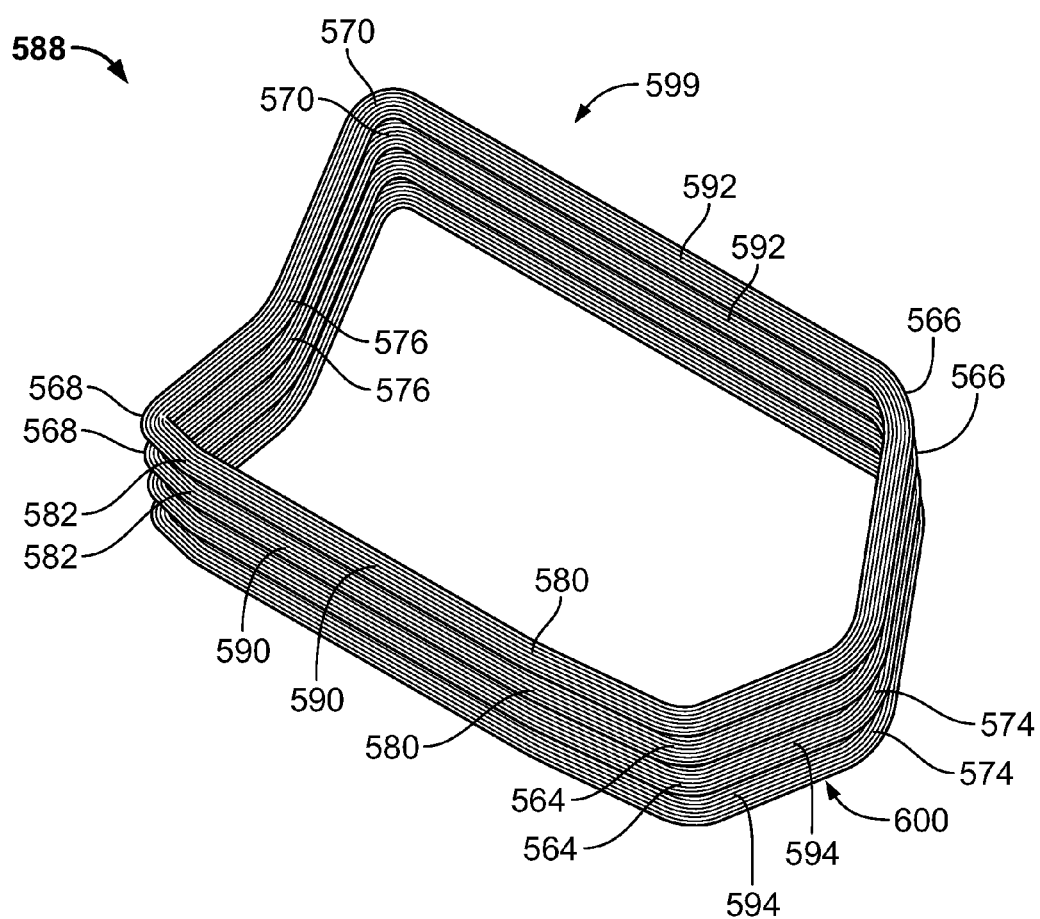
FIG. 15 is a perspective view of a plurality of the exemplary electrical coils coupled together.
Figure 16:
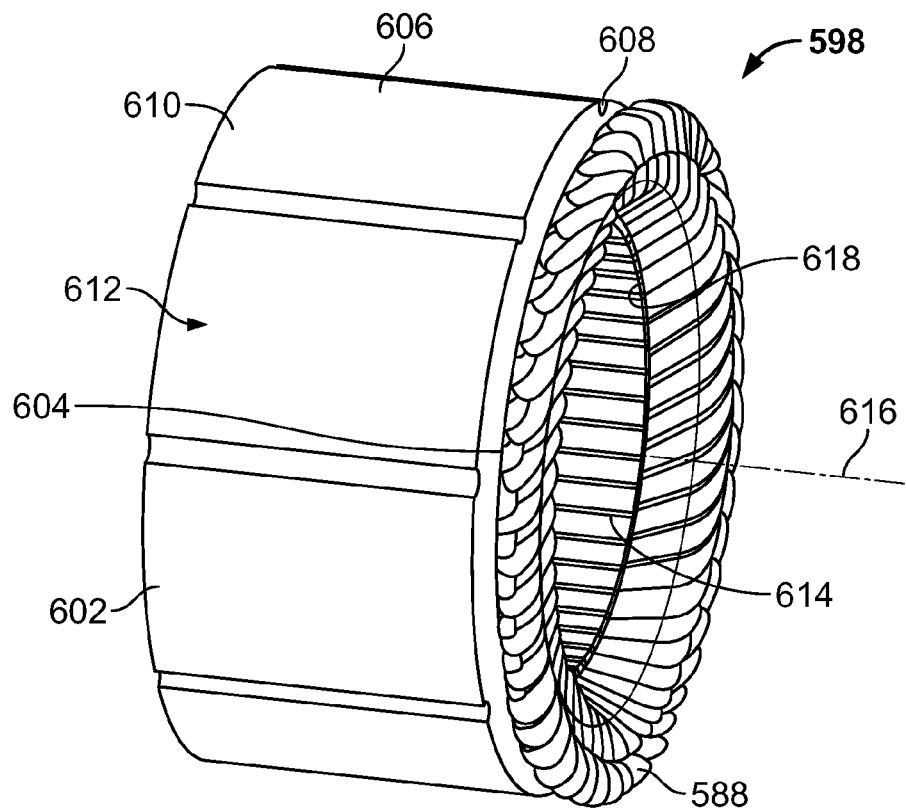
FIG. 16 is a perspective view of the plurality of the exemplary electrical coils shown in FIG. 15 coupled to a stator.

FIG. 15 is a perspective view of a plurality of electrical coils 588 coupled together. FIG. 16 is a perspective view of the plurality of electrical coils 588 shown in FIG. 15 coupled to a stator 598. Bends 564, 566, 568, 570, 574, 576, 580, 582, 581 and 587 in electrical coil 588 facilitate coupling together adjacent electrical coils 588. In the exemplary embodiment, bends 564, 566, 568, 570, 574, 576, 580, 582, 581 and 587 facilitate coupling together electrical coils 588 in a sequential arrangement 599. More particularly, sequential arrangement 599 includes a nest arrangement 600. First corner bend 564 and third corner bend 568 are configured to align with and couple to first corner bend 564 and third corner bend 568 of adjacent electrical coil 588. Second corner bend 566 and fourth corner bend 570 are configured to align with and couple to second corner bend 566 and fourth corner bend 570 of adjacent electrical coil 588. First bend 574 is configured to couple and within adjacent first bend 574 of adjacent electrical coil 588. Second bend 576 is configured to couple and within adjacent second bend 576 of adjacent electrical coil 588. Third bend 580 is configured to couple to and within adjacent third bend 580 of adjacent electrical coil 588. Fourth bend 582 is configured to couple to and within adjacent fourth bend 582 of adjacent electrical coil 588.

Stator 598 includes a stator core 602 having a plurality of slots 604, and the plurality of electrical coils 588. The stator core 602 is preferably formed from a plurality of laminations 606, and is preferably cylindrically shaped. It will be appreciated that the stator core 602 need not be formed from individual laminations 606, but could also be formed of a single, cast piece. Stator core 602 has a first end 608, a second end 610, an outer circumferential surface 612, and an opening 614 that extends through it along an axis 616, thereby forming an inner circumferential surface 618. It is noted that stator core 602 may be formed of any one of numerous known materials known in the art including, but not limited to, electrical-grade steels such as cobalt-iron and silicon-iron.

Each of the plurality of slots 604 is formed on inner circumferential surface 618. Slots 604 preferably extend longitudinally between the first and second ends 608, 610 of stator core 602, and are preferably evenly spaced around the inner circumferential surface 618. In addition, each of the slots 604 is radially sized to receive electrical coils 588, one in an inner slot position and one in an outer slot position. Electrical coils 588 are wound around the stator core 602 by inserting nest arrangement 600 into adjacent slots 604.

Figure 17:
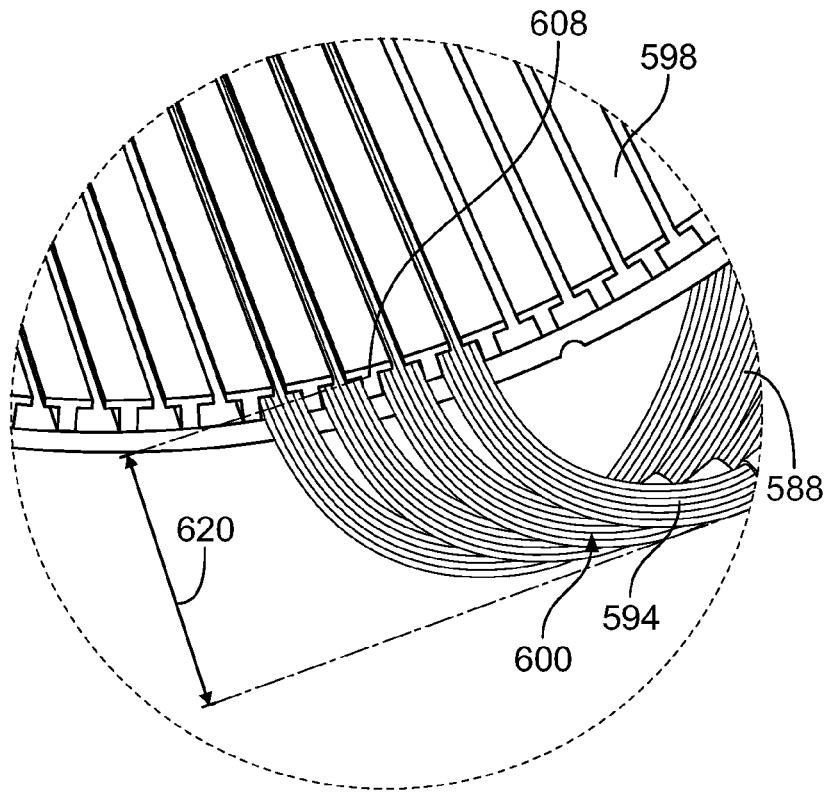
FIG. 17 is a partial view of FIG. 16 illustrating the plurality of the exemplary electrical coils coupled to the stator shown in FIG. 16.

FIG. 17 is a partial view of FIG. 16 illustrating the plurality of electrical coils 588 coupled to stator 598. Pre-forming electrical coils 588 reduces insertion time and effort by reducing effective coil span and coil length 582, 581 and 587. Moreover, nest arrangement 600 reduces and/or eliminates a stacking effect during electrical coil insertion. Still further, nest arrangement 600 reduces and/or eliminates additional forming to be applied to electrical coil 588 during insertion into stator 598. More particularly, preformed first end turn 594 and second end turn 596 minimizes an extension length 620 from first end 608 and second end 610 respectively. More particularly, extension length 620 is less than conventional extension length of typical end turns. Accordingly, nest arrangement 600 reduces and/or eliminates interference with motor components (not shown) such as, but not limited to, motor brackets and baffles. Moreover, since nest arrangement 600 reduces and/or eliminates further forming such a pushing or bending electrical coil 588 to make room for adjacent electrical coil 588, nest arrangement 600 reduces stress applied to the installer's arms and/or hands. The ergonomics of electrical coil insertion is improved which increases process productivity. Moreover, since nest arrangement 600 reduces and/or eliminates further forming such a pushing or bending electrical coil 588 to make room for adjacent electrical coil 588, nest arrangement 600 reduces stress applied insulating coating 560.

Figure 18:
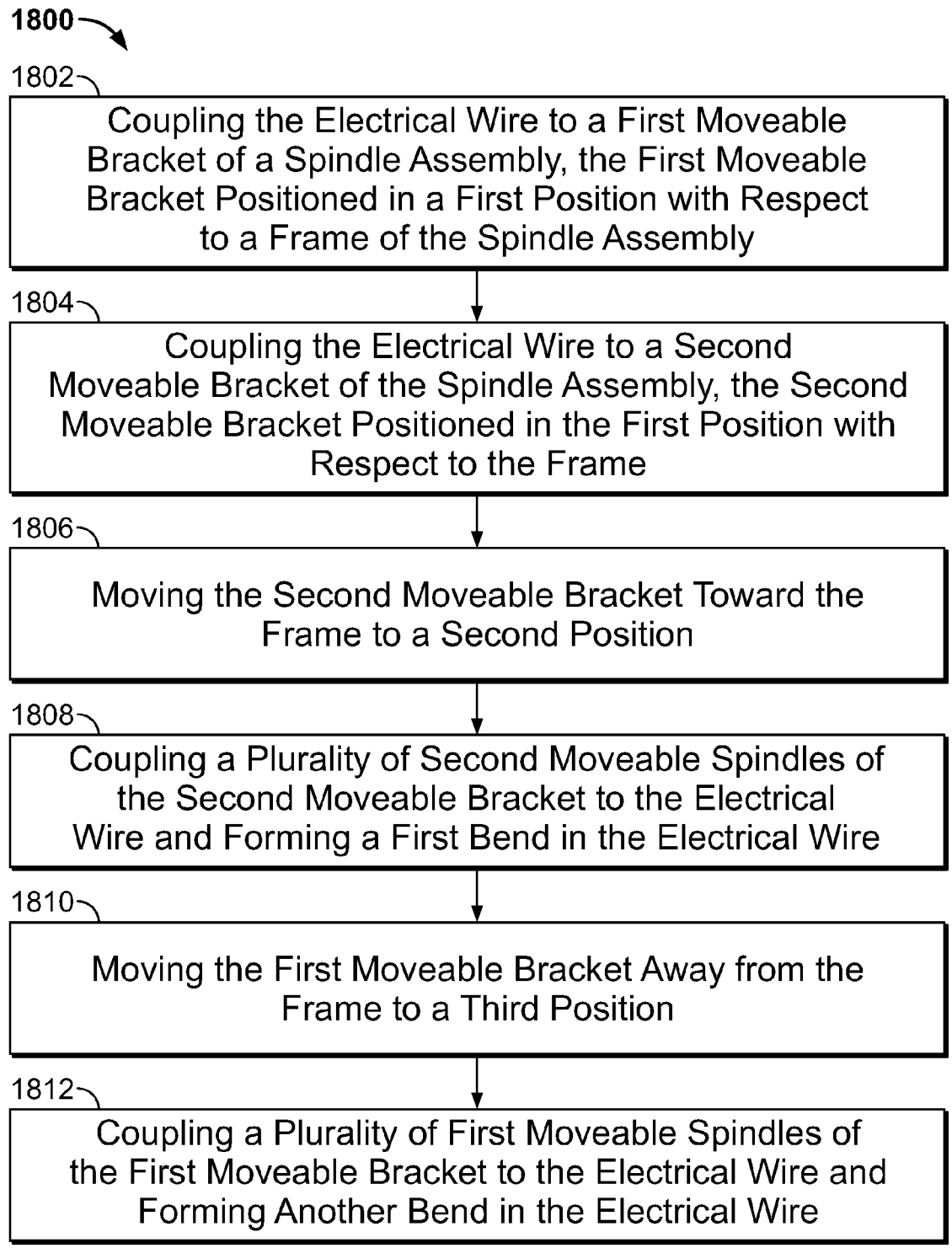
FIG. 18 is an exemplary flowchart illustrating a method of assembling an electrical coil.

FIG. 18 illustrates an exemplary flowchart illustrating a method 1800 of assembling electrical coil 588. Method 1800 includes coupling an electrical wire, such as electrical wire 588 (shown in FIG. 1) to a spindle assembly, for example spindle assembly 114 (shown in FIG. 1). More particularly, method 1800 includes coupling 1802 the electrical wire to a first moveable bracket, such as first moveable bracket 126 (shown in FIG. 1), of the spindle assembly. The first moveable bracket is positioned in a first position, such as first position 102 (shown in FIG. 1), with respect to a frame, for example frame 104, of the spindle assembly. Method 1800 includes coupling 1804 the electrical wire to a second moveable bracket, such as second moveable bracket 270 (shown in FIG. 1), of the spindle assembly. The second moveable bracket is positioned in the first position with respect to the frame.

In the exemplary embodiment, method 1800 includes moving 1806 the second moveable bracket toward the frame to a second position, for example second position 572 (shown in FIG. 4). A plurality of second moveable spindles, such as second moveable spindles 350 (shown in FIG. 4), of the second moveable bracket is coupled 1808 to the electrical coil to form a first bend, such as first bend 574 (shown in FIG. 4) in the electrical wire. The method 1800 further includes moving 1810 the first moveable bracket away from the frame to a third position, for example third position 578 (shown in FIG. 7). Moreover, in the exemplary embodiment, method includes coupling 1812 a plurality of first moveable spindles, such as first moveable spindles 240 (shown in FIG. 7), of the first moveable bracket to the electrical wire and forming another bend, for example bend 580 (shown in FIG. 7), in the electrical wire.

The exemplary embodiments described herein facilitate forming electrical coils for an electrical machine. More particularly, the exemplary embodiments are configured to facilitate insertion of the electrical coil within the electrical machine. Moreover, the exemplary embodiments reduce stress applied to the installer's arms and/or hands during electrical coil insertion. Still further, the exemplary embodiments reduce stress applied to insulation of the electrical coil during electrical coil insertion. Additionally, the exemplary embodiments reduce the length of the electrical coil which reduces resistive losses during operation of the electrical coil.

Exemplary embodiments of a coil forming apparatus and methods for assembling an electrical coil are described above in detail. The methods and systems are not limited to the specific embodiments described herein, but rather, components of systems and/or steps of the methods may be utilized independently and separately from other components and/or steps described herein. For example, the methods may also be used in combination with other manufacturing systems and methods, and are not limited to practice with only the systems and methods as described herein. Rather, the exemplary embodiment can be implemented and utilized in connection with many other electrical component applications. Moreover, the electrical machine can include a forced air device, such as a fan, coupled to housing and/or shaft.

While the embodiments described herein are described with respect to motors in which a stator surrounds a rotor such as, for example, a permanent magnet rotor or an induction rotor, embodiments are contemplated in which an "inside-out" motor incorporates one or more of the improvements described herein. Inside-out motors refer to motors where a stationary stator is surrounded by a rotating rotor. Further, the embodiments are applicable to any permanent magnet rotating machine.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A coil forming apparatus for forming an electrical coil from an electrical wire, said apparatus comprising:
   a frame;
   a spindle assembly coupled to said frame, said spindle assembly comprising:
   a first arm coupled to said frame, said first arm comprising a first moveable bracket and a plurality of first moveable spindles coupled to said first moveable bracket and to the electrical wire in a first position; and
   a second arm coupled to said frame, said second arm comprising a second moveable bracket comprising a plurality of second moveable spindles coupled to said second moveable bracket and coupled to the electrical wire in said first position; and
   a drive system coupled to said first moveable bracket and said second moveable bracket, said drive system configured to:
   move said second moveable bracket toward said frame to a second position, said plurality of second moveable spindles of said second arm are configured to form a bend in the electrical wire; and move said first moveable bracket away from said frame to a third position, said plurality of first moveable spindles of said first arm are configured to form another bend in the electrical wire.

2. The coil forming apparatus of claim 1, wherein said first arm comprises a first stationary bracket coupled to said first moveable bracket and comprises a plurality of first stationary spindles aligned with said plurality of first moveable spindles in said first position and un-aligned with said plurality of first moveable spindles in said third position.

3. The coil forming apparatus of claim 1, wherein said second arm comprises a second stationary bracket coupled to said second moveable bracket and comprises a plurality of second stationary spindles aligned with said plurality of second moveable spindles in said first position and un-aligned with said plurality of second moveable spindles in said second position.

4. The coil forming apparatus of claim 1, further comprising a third arm coupled to said frame, said third arm comprising a third moveable bracket and a plurality of third moveable spindles coupled to said third moveable bracket and to the electrical wire in said first position.

5. The coil forming apparatus of claim 4, wherein said drive system is configured to move said third moveable bracket away from said frame in said third position, said plurality of third moveable spindles are configured to form another bend in the electrical wire.

6. The coil forming apparatus of claim 4, wherein said third arm comprises a third stationary bracket coupled to said third moveable bracket and comprises a plurality of third stationary spindles aligned with said plurality of third moveable spindles in said first position and un-aligned with said plurality of third moveable spindles in said third position.

7. The coil forming apparatus of claim 1, further comprising a fourth arm coupled to said frame, said fourth arm comprising a fourth moveable bracket and a plurality of fourth moveable spindles coupled to said fourth moveable bracket and to the electrical wire in said first position.

8. The coil forming apparatus of claim 7, wherein said drive system is configured to move said fourth moveable bracket toward said frame in said second position, said plurality of fourth moveable spindles are configured to form another bend in the electrical wire.

9. The coil forming apparatus of claim 7, wherein said fourth arm comprises a fourth stationary bracket coupled to said fourth moveable bracket and comprises a plurality of fourth stationary spindles aligned with said plurality of fourth moveable spindles in said first position and un-aligned with said plurality of fourth moveable spindles in said second position.

10. The coil forming apparatus of claim 1, wherein said first moveable bracket comprises a cavity that is configured to receive said plurality of said first moveable spindles in a fourth position.

11. The coil forming apparatus of claim 1, wherein said second arm comprises a second stationary bracket coupled to said second moveable bracket and comprises a plurality of grooves that are configured to receive said second stationary spindles in a fourth position.

12. A method of manufacturing an electrical coil from an electrical wire using an apparatus, the apparatus including a spindle assembly coupled to a frame, the spindle assembly including a first arm and a second arm, each of the first and second arms coupled to the frame, said method comprising:
  coupling the electrical wire to a first moveable bracket of the first arm of the spindle assembly, the first moveable bracket positioned in a first position with respect to the frame;
  coupling the electrical wire to a second moveable bracket of the second arm of the spindle assembly, the second moveable bracket positioned in the first position with respect to the frame;
  moving the second moveable bracket toward the frame to a second position;
  coupling a plurality of second moveable spindles of the second moveable bracket to the electrical wire and forming a bend in the electrical wire;
  moving the first moveable bracket away from the frame to a third position; and
  coupling a plurality of first moveable spindles of the first moveable bracket to the electrical wire and forming another bend in the electrical wire.

13. The method of claim 12, further comprising coupling the electrical wire to a third moveable bracket of the spindle assembly and moving the third moveable bracket to the third position.

14. The method of claim 13, further comprising coupling a plurality of third moveable spindles of the third moveable bracket to the electrical wire and forming another bend in the electrical wire.

15. The method of claim 12, further comprising coupling the electrical wire to a fourth moveable bracket of the spindle assembly and moving the fourth moveable bracket to the second position.

16. The method of claim 15, further comprising coupling a plurality of fourth moveable spindles of the fourth moveable bracket to the electrical wire and forming another bend in the electrical wire.

* * * * *